UNITED STATES PATENT OFFICE.

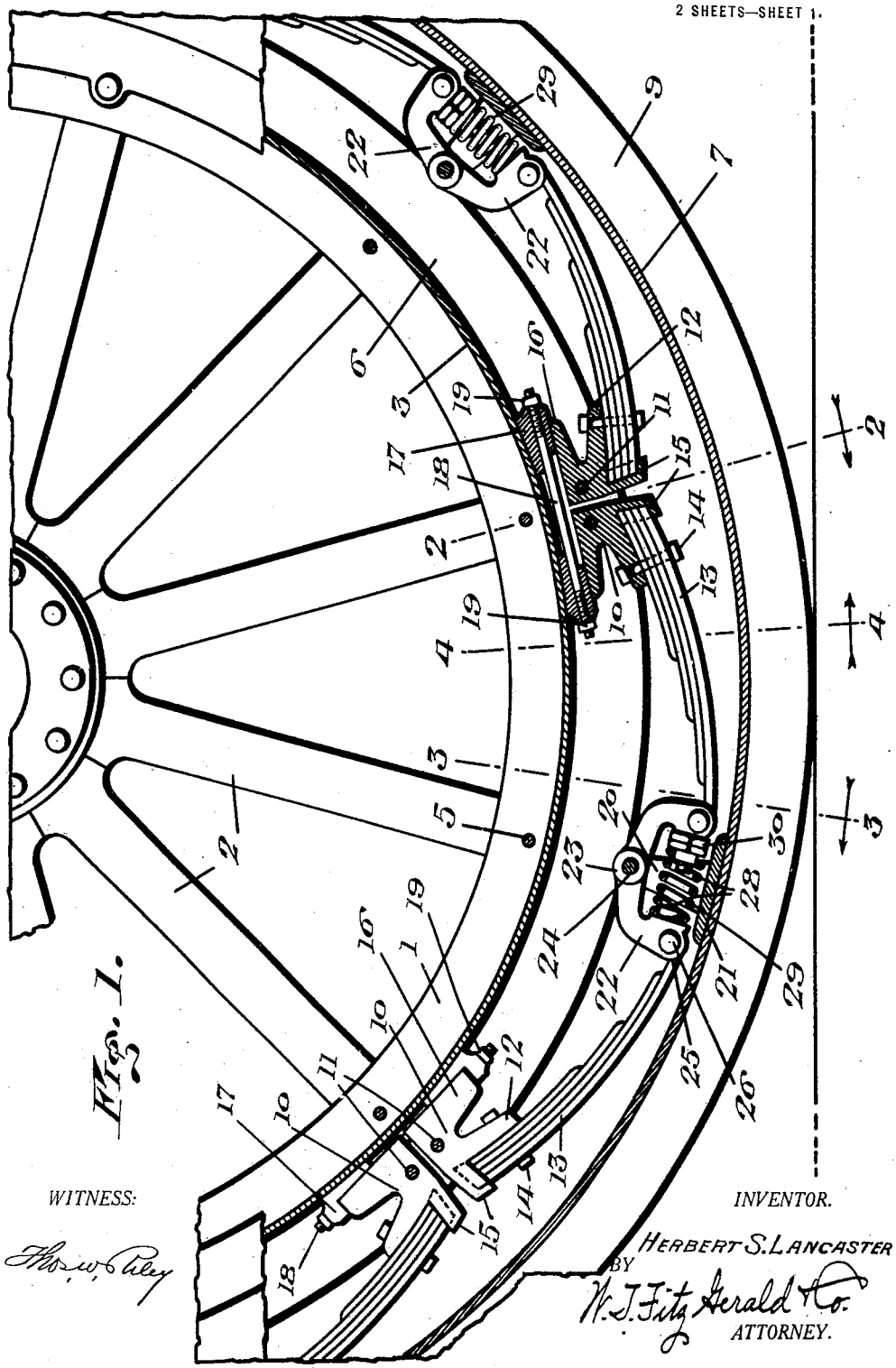

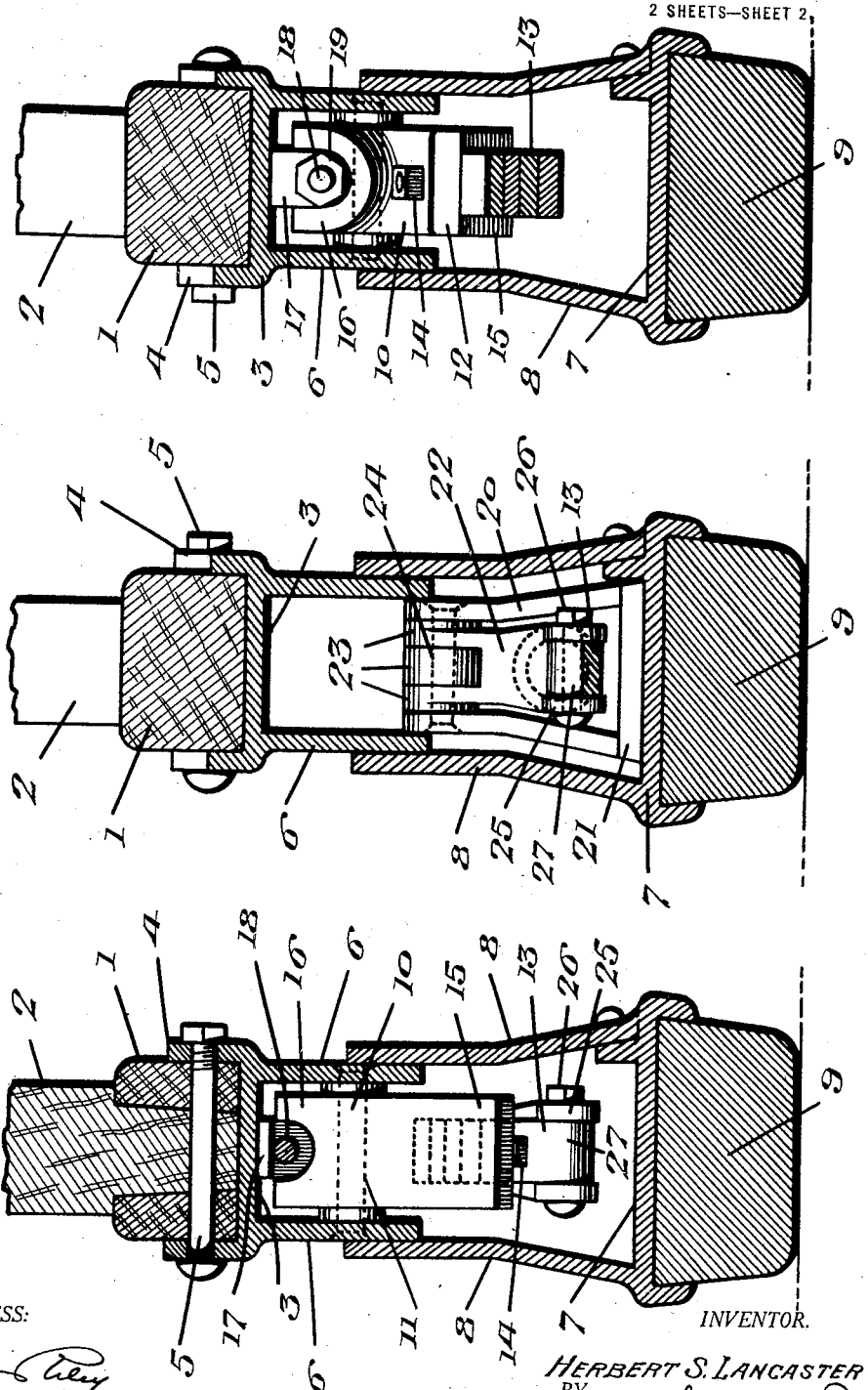

HERBERT S. LANCASTER, OF WABASH, INDIANA.

RESILIENT WHEEL.

1,395,435.  Specification of Letters Patent.  Patented Nov. 1, 1921.

Application filed December 30, 1919. Serial No. 348,347.

*To all whom it may concern:*

Be it known that I, HERBERT S. LANCASTER, a citizen of the United States, residing at Wabash, in the county of Wabash and State of Indiana, have invented certain new and useful Improvements in Resilient Wheels; and I do hereby declare the following to be a full, clear, and exact description of the invention, such as will enable others skilled in the art to which it appertains to make and use the same.

The present invention relates to resilient wheels, and has for an object the provision of leaf springs between the outer and inner rims and novel means for adjusting the tension thereof.

It is the object of the invention to improve the spring construction between the outer and inner rims, in order to make the device more efficient, durable and resilient.

Another object is the provision of laminated leaf springs between the rims and novel means for mounting same for adjustment to increase or decrease the tension thereof.

A further object is the provision of novel means for connecting the free ends of said leaf springs to the corresponding rim, whereby to permit of freedom of movement and flexibility, so that the wheel will be cushioned effectively and easy riding.

With the foregoing and other objects in view, which will be apparent as the description proceeds the invention resides in the construction and arrangement of parts hereinafter described and claimed, it being understood that changes can be made within the scope of what is claimed without departing from the spirit of the invention.

The invention is illustrated in the accompanying drawings, wherein—

Figure 1 is a fragmentary elevation of a wheel embodying the present improvements, portions being broken away and shown in section.

Figs. 2, 3 and 4 are cross sectional views taken on the respective lines 2—2, 3—3 and 4—4 of Fig. 1, on an enlarged scale.

The body of the wheel may be of any suitable type, being of the artillery type as shown, and having the felly 1 in which the outer ends of the spokes 2 are fitted, and an inner rim or band 3 is fitted on said felly, being provided with inwardly extending ears 4 overlapping the opposite sides of the felly, through which bolts 5 extend for securing said rim on the felly. The rim 3 has outwardly extending annular flanges 6 adjacent to its opposite edges for concealing and mounting the spring construction, as will hereinafter more fully appear. An outer rim 7 surrounds and is spaced from the inner rim 3, and has spaced inwardly extending annular flanges 8 overlapping the flanges 6, for guiding the rim 7 for movement in the plane of the wheel, and to inclose the working parts and keep out dirt and foreign matter. One of the flanges 8 can be removable, as shown, for convenience in assembling the parts and to give access to the working parts for purpose of cleaning, repairs or adjustment. A solid tire 9 is fitted on the rim 7, and any suitable tire can be used, it not being necessary to employ a pneumatic tire, thereby eliminating the liability of punctures and blow-outs.

In order to mount the leaf springs within the space between the inner and outer rims, spring base members 10 are disposed between the flanges 6 adjacent to the rim 3 and are arranged in pairs in reverse positions. These members 10 are mounted for rocking movement upon transverse pivot bolts 11 extending through and carried by the flanges 6, and said members 10 have spring seats 12 extending away from one another and away from the pivot bolts 11 on which the basal portions of the leaf springs 13 are seated. The leaf springs 13 are laminated, and their thicker basal end portions are secured on the seats 12 by means of bolts 14 or the like, and said members 10 have outstanding sockets 15 receiving the basal ends of said springs to assist in securely anchoring said springs to the base members 10.

In order to adjust the tension of the springs 13, the members 10 are provided with longitudinally grooved portions or arms 16 extending in the same general direction as the seats 12 away from the pivots 11, and wedges 17 are fitted against the rim 3 and within the grooves of the arms 16. A rod 18 extends through each pair of wedges 17, and has nuts 19 screw threaded on the terminals thereof, whereby said nuts can be tightened for forcing said wedges toward one another, thereby swinging the arms 16 away from the rim 3, and this will swing the members 10 whereby to have a tendency to swing the springs 13 outwardly to bring them under greater tension. By tightening either nut 19 of one rod 18, the tension between the corresponding springs 13 will be equalized, because the wedges will be moved toward one another with the same pressure between the arms 16 and rim 3, the wedge of the spring under least tension moving before the other wedge, unless the springs are of equal tension when both wedges will move uniformly.

As a means for connecting the outer free ends of the springs 13 to the outer rim 7 for free movement and to provide for flexibility of action, inwardly extending U-shaped posts 20 are carried by the rim 7, being provided with bases 21 secured to said rim 7 in any suitable manner. A pair of oppositely extending shackle arms 22 is carried by each post 20 and are provided at their adjacent ends with hinge butts 23 mounted on a pivot pin 24 carried by said post. Said arms project along divergent lines to the free ends of the corresponding springs 13, and the free ends of the arms 22 are bifurcated, as at 25, to receive the springs 13, and have pins or rivets 26 therein which are pivotally embraced by the eyes or hinge butts 27 formed on the free ends of the springs 13. The springs 13 are thus hingedly connected with the arms 22 which are mounted for swinging movement, thereby providing for freedom of action of the springs 13, since the arms 22 can swing as the springs 13 are flexed. This provides for a smooth action, and the arms 22 will flexibly and efficiently transmit strains between the rims 7 and springs 13, said arms 22 serving as hangers for supporting the springs 13 from the post 20 when such post is at the bottom of the wheel. The tendency for the rim 3 to be depressed, will move the springs 13 at the bottom of the wheel toward the bottom of the rim 7, thereby forcing the free ends of the springs 13 toward one another, which is permitted by the swinging movement of the arms 22 toward one another. Such arms at the bottom, however, serve as hangers carrying the weight exerted on the lower springs 13.

The arms 22 are yieldingly separated, whereby the springs 13 will not yield too freely, and to also enhance the resilient action. For this purpose the arms 22 are provided at their free ends with studs 28 projecting toward one another, and a coiled expansion spring 29 is disposed between the pair of arms 22 and its end convolutions surround said studs to retain said spring in place, adjusting nuts 30 being screw threaded on one stud for adjusting the tension of the spring 29. Said spring will therefore have a tendency to swing the arms 22 apart, whereby the springs 13 in swinging the arms 22 toward one another, will compress the spring 29, and said spring 29 will resist such movement of the arms 22, for otherwise, the full resiliency of the springs 13 might be lost.

The cushioning action of the wheel can be regulated by the adjusting wedges 17 to regulate the tension of the springs 13, and further adjustment is had by means of the nuts 30 to regulate the tension of the springs 29. By the provision of the leaf springs 13 and the arms 22 and springs 29 for connecting said leaf springs to the rim 7, this provides for a free resilient yielding action between the rims, to absorb shocks and strains, and to provide for easy riding.

Having thus described the invention, what is claimed as new is:—

1. A resilient wheel embodying inner and outer rims, posts extending from one rim toward the other rim, a pair of arms hingedly connected to each post on a common pivot and extending toward the first-named rim and diverging apart, pairs of leaf springs having their basal portions secured to the second named rim adjacent to one another between the pairs of arms and extending away from one another and having their free ends hingedly connected to the corresponding arms, whereby the arms, between those portions of the rims which are moved toward one another, will be swung toward one another, and coiled expansion springs between the arms for swinging them apart.

2. A resilient wheel embodying inner and outer rims, base members pivoted to one rim and having seats, laminated leaf springs having their basal portions fitted on said seats, and their free ends connected to the other rim, means for securing said springs on said seats, and means for adjusting said base members.

3. A resilient wheel embodying outer and inner rims, base members pivotally mounted and carried by one rim and arranged in pairs, said members having spring seats and arms, leaf springs having their basal portions secured on said seats and their free ends connected to the other rim, wedges disposed between said arms and the first named rim, and means for moving said wedges toward one another to swing said arms away from said first named rim to swing said spring seats likewise.

4. A resilient wheel embodying concentric rims, members pivotally connected to one rim, leaf springs extending from said members and connected to the other rim, said members having portions extending in the same general direction as the springs from the pivots, and wedges between said portions and first named rim for moving said portions away from said rim to bring the springs under tension.

5. A resilient wheel embodying concentric rims, leaf springs connected to one rim and also connected to the other rim, means between each spring and first named rim movable for moving said spring away from the first named rim to bring it under tension, and adjusting means connecting said means in pairs for moving them relatively to one another so as to distribute the force between the springs in pairs to equalize the tension.

6. A resilient wheel embodying concentric rims, leaf springs connected to one rim and also connected to the other rim, a wedge arranged between each spring and the first named rim and in operative connection with the spring for moving said spring away from said rim to bring it under tension, and means connecting said wedges in pairs for moving them relatively for applying equal pressure to corresponding pairs of springs so as to equalize the tension thereof.

7. A resilient wheel embodying concentric rims, pairs of leaf springs between said rims, the butt ends of the springs of each pair being adjacent to one another and the springs diverging away from one another, pivots carried by one rim, members to which the butt ends of the springs are secured mounted on said pivots, said members having portions extending in the same direction as the springs and provided with grooves, wedges between said portions and said rim and fitted in said grooves, rods extending through the wedges of the pairs of springs, and means on the rods for moving the wedges toward one another.

In testimony whereof I have signed my name to this specification in the presence of a subscribing witness.

HERBERT S. LANCASTER.

Witness:
J. H. SAYRE.